July 22, 1958
M. ROSENTHAL
2,844,031
THERMOMETER SHIELD
Filed March 22, 1957
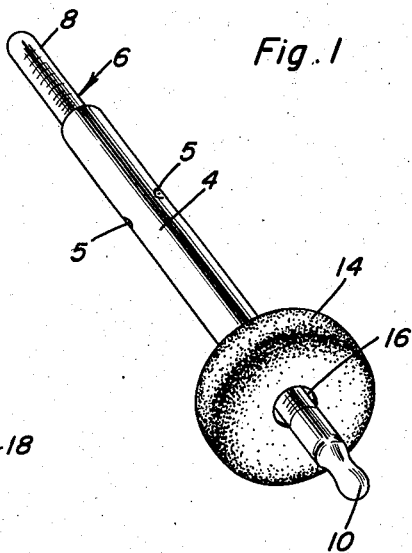
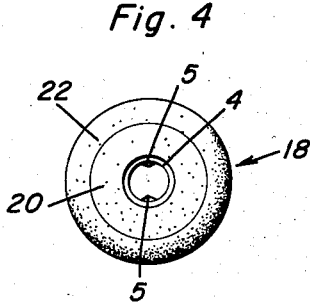
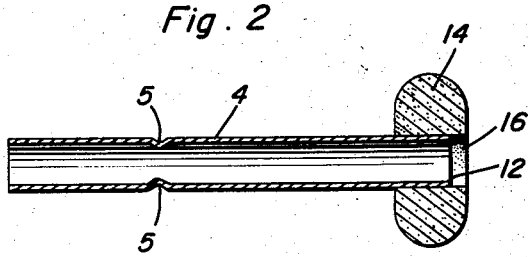
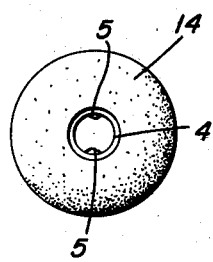
Monto Rosenthal
INVENTOR.

United States Patent Office 2,844,031
Patented July 22, 1958

2,844,031
THERMOMETER SHIELD
Monto Rosenthal, Newton Center, Mass.

Application March 22, 1957, Serial No. 647,874

3 Claims. (Cl. 73—343)

The present invention relates to a novel article of manufacture which is multipurpose in character in that it founctions, on the one hand, as a shield for a thermometer in use and, in addition, as a holder for a cough drop, a piece of medicated candy, or any solid but soluble sweet resembling, in some respects, a lollypop.

The primary objective is to provide, for use in the home or in a physician's office, a tubular open ended shield having a piece of hard candy or an equivalent soluble sweet on one end which will induce the child user to place it in the mouth, much like would be done with a lollypop, said tube being such in diameter and length that it enables one to pass a thermometer therethrough so that the child's temperature may be conveniently taken while the child is busy with the lollypop.

Another object of the invention is to provide an article as stated which, regardless of its use in concealing or disguising a thermometer, may be used as an effective means of giving the child user medicine where, for example, the medicine is contained by impregnation or otherwise in the candy head carried by one end of the tube. In this connection it may be pointed out that the enticing solid sweet may be medicated in many ways depending upon different ailments. That is to say, it may take the form of a cough drop, or may be a medication which would act as a laxative, or any other medication for varying illnesses.

Other objects, features and advantages will become more readily apparent from the following description and the accompanying drawing.

In the drawing, wherein like numerals are employed to designate like parts throughout the views:

Fig. 1 is a perspective view of the candy-equipped tube with the thermometer associated therewith;

Fig. 2 is a central longitudinal sectional view of the same with the thermometer removed;

Fig. 3 is an end elevation looking at the invention seen in Fig. 2 in a direction from left to right; and Fig. 4 is also an end elevational of the invention seen in Fig. 2 but showing a modification wherein the candy head or sucker is made up of laminations of differing candy each having its own distinctive medicament impregnated therein.

Reference being had to the drawing the tube or handle is denoted by the numeral 4 and it is of suitable cross-sectional diameter and length to serve its intended purposes and particularly to accommodate a conventional-type thermometer 6. In fact, the tube will be somewhat shorter than the thermometer so that the respective end portions 8 and 10 of the thermometer project beyond the respective ends of the tube or handle. On the right hand end portion 12 of the tube there is attached a piece of hard candy head 14 or solid sucker or equivalent means preferably of annular form, the central opening therein being denoted at 16. Manifestly, the shape of this candy head will vary. In any event, providing a candy head or piece of candy or any suitable soluble solid sweet on one end of a tube provides a unique special purpose lollypop in that the candy may be in the form of a cough drop, or may be otherwise shaped and suitably impregnated with a medicament so that it constitutes a medicated applicator or equivalent media.

With further reference to the specific details the tube is preferably provided intermediate its ends and usually at diametrically opposite points with indentations 5. These are sufficient in size that they project into the bore of the tube and constitute boss-like detents. That is to say, they will have friction contact with the thermometer and will somewhat rigidly aid in keeping the thermometer in place when it is in use in the manner seen in Fig. 1.

With reference to Fig. 4 the tube is again denoted by the numeral 4 and the friction detents by the numeral 5. However, the candy sucker, head or equivalent sweet is denoted by the numeral 18. Instead of being of solid form and one-piece as seen in the other figures, the candy is made up of rings 20 and 22 each of which is of a distinct flavor and impregnated with a distinctive medicament. Each layer or lamination or ring as the case may be will contain its distinctive medication thus making the same somewhat multipurpose in character.

As will be evident, the tube may be of cardboard or, if preferred, it may be of some appropriate non-rigid commercial plastic suitable to the needs of makers and users. With the construction depicted the headed tube becomes a shield for a thermometer and allows the thermometer to be inserted through the bore or passage of the tube and extend a short distance beyond the candy thus enabling the use of the device as a practical way of taking children's temperatures. In addition the invention serves without the thermometer as a practical and enticing way whereby a physician may give a child patient medication in an appealing but nevertheless disguised manner.

Not discounting the value of the invention as a pleasant way of giving children medication, its primary use is that of a unique shield for inserting a thermometer in a child's mouth for temperature taking purposes.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination, a tubular member having its ends open and provided on one end with candy head, sucker or the like, and a conventional thermometer passing through the bore of the tubular member, the bore being of an internal diameter greater than the cross-section of the thermometer and the thermometer being of a length greater than the over-all length of the tubular member.

2. As a new article of manufacture, a handle-forming tube having a bore of predetermined diameter therethrough and open at its respective ends so that the tube may serve as a disguising shield and temporary holder for a conventional thermometer, the tube being of a predetermined length and being provided on one end with a solid sweet impregnated with medicine, in the form of a cough drop, or otherwise of an equivalent construction.

3. The structure defined in claim 2 and wherein said tube is provided intermediate its ends with detents projecting into the bore and adapted to frictionally contact the thermometer in a manner to assist in holding the thermometer in place and against displacement.

References Cited in the file of this patent

UNITED STATES PATENTS

| 2,445,539 | Singer | July 20, 1948 |
| 2,672,053 | Geyer | Mar. 16, 1954 |